United States Patent [19]

Dickopp et al.

[11] 4,183,043
[45] Jan. 8, 1980

[54] TRILINEAR SEQUENTIAL TRANSMISSION SYSTEM FOR A COLOR TELEVISION SIGNAL, PARTICULARLY FOR A RECORDING

[75] Inventors: Gerald Dickopp, Hanover; Gerhard Mahler, Rodenberg-Algesdorf; Werner Scholz, Gehrden, all of Fed. Rep. of Germany

[73] Assignee: TED Bildplatten Aktiengesellschaft, Switzerland

[21] Appl. No.: 780,414

[22] Filed: Mar. 23, 1977

[30] Foreign Application Priority Data

Mar. 25, 1976 [DE] Fed. Rep. of Germany ....... 2612619

[51] Int. Cl.² .............................................. H04N 9/42
[52] U.S. Cl. .......................................... 358/11; 358/4
[58] Field of Search ..................... 358/4, 8, 11, 21, 37

[56] References Cited

U.S. PATENT DOCUMENTS

| 3,808,359 | 4/1974 | Scholz | 358/4 |
|---|---|---|---|
| 4,052,736 | 10/1977 | Griffiths | 358/4 |

FOREIGN PATENT DOCUMENTS

| 2258867 | 6/1974 | Fed. Rep. of Germany | 358/8 |
|---|---|---|---|
| 2433023 | 1/1976 | Fed. Rep. of Germany | 358/21 |

Primary Examiner—Robert L. Griffin
Assistant Examiner—Joseph A. Orsino, Jr.
Attorney, Agent, or Firm—McGlew and Tuttle

[57] ABSTRACT

The disclosure is an improvement in a three-line sequential transmission system for a color television signal, particularly for recording, and where the sequential signal is transformed again, during reproduction with a series-connection of line delay lines, into three simultaneous color signals, and a luminance signal is obtained by composing the signals from several successive lines. In accordance with the disclosure, the luminance signal has an amplitude ratio between these signals, to increase the picture sharpness in the vertical direction, such that the amount of the luminance transmission function of the entire system, including recording and reproduction, at the frequencies $(n+\frac{1}{2})f_H$ is substantially equal to those of the frequencies $n \cdot f_H$ where $n = 0, 1, 2 \ldots$ and $f_H$ is the line frequency. The composition is effected such that zeros appear in the low frequency range of the transmission function at the frequencies $(n \pm \frac{1}{3})f_H$, and the zeros of the entire system are multiple even-numbered zeros, with the transmission functions of both the recording and the reproduction having a zero. A differential signal, derived from the undelayed signal and the signal delayed by three lines, is fed to the luminance signal in a reproduction circuit.

15 Claims, 9 Drawing Figures

LUMINANCE TRANSMISSION
FUNCTION

TRANSIENT

ONE LINE

TRILINEAR SEQUENTIAL TRANSMISSION SYSTEM FOR A COLOR TELEVISION SIGNAL, PARTICULARLY FOR A RECORDING

FIELD AND BACKGROUND OF THE INVENTION

For recording a color video signal with narrow-band recorders, for example video disc recorders, it is known, from German Pat. No. 1,261,876, to record the three color signals R, G and B sequentially line by line, and to make the three color signals available again simultaneously, during the reproduction, with a series connection of two line delay lines and with three switches actuated at the line frequency. It is also known to effect three-line sequential recording only in a lower frequency range of about 0–0.5 MH$_z$ and to record a luminance signal in each line in an upper frequency range of about 0.5–3.0 MH$_z$.

Furthermore, it is known from German Pat. No. 1,936,594 to form, in the lower frequency range during reproduction, a luminance signal by adding the sequential color signals from three sequential lines by adding up, for example, the signals with the same amplitude factors. In this way, an average is obtained over several lines and thus a reduction of the picture sharpness in the vertical direction.

It is also known from German Offenlegungsschrift No. 2,446,376 to increase the picture sharpness in the vertical direction for the lower frequency, in a manner that the luminance signal is composed, in the lower frequency range of signals, of more than three, for example four, sequential lines.

SUMMARY OF THE INVENTION

The present invention is directed to the problem of providing means for the composition of the luminance signal from the signals of several successive lines, and wherein optimal increase of the picture sharpness, in a vertical direction, is attained. This problem is solved by composing the luminance signal from the signals of several successive lines in an amplitude ratio between these signals, to increase the picture sharpness in the vertical direction, such that the amount of the luminance transmission function of the entire system, including recording and reproduction, at the frequencies $(N+\frac{1}{2})f_H$ is substantially equal to those of the frequencies $n \cdot f_H$ where $n=0, 1, 2 \ldots$ and $f_H$ is the line frequency. The invention also includes further advantageous developments.

The invention is based on the following finding. The luminance transmission function of the above-mentioned three-line sequential system has maxima at the frequencies $n \cdot f_H$ and, due to the triple line line sequential recording, two zeros at the frequencies $(n \pm \frac{1}{3})f_H$. Between these two zeros, there is another relative maximum at the frequencies $(n+\frac{1}{2})f_H$ whose amplitude, however, is only about $\frac{1}{3}$ that of the maxima at the frequencies $n \cdot f_H$. Due to the special composition of the luminance signal from the signals of more than three successive lines, the above-mentioned small maximum at the frequencies $(n+\frac{1}{2})f_H$ can be increased to the value of the maxima at the frequencies $n \cdot f_H$. Due to thise increase of the spectral components at the frequencies $(n+\frac{1}{2})f_H$, the picture sharpness can be considerably increased in the vertical direction.

If this increase is effected only, or partly, during recording, and thus before the transmission section or the recording apparatus, the cross-coloring of the luminance signal into the color channel can be increased. This cross-coloring can be reduced, however, if the zeros at the frequencies $(n \pm \frac{1}{3})f_H$ are designed, according to another feature of the invention and by measures on the receiving side, as even-numbered multiple zeros, particularly as double zeros. This is due to the fact that the spectral energy of the color difference signal is substantially at these zeros and a double zero, as will be explained more fully hereinafter, effects a greater clearance of the luminance transmission function, and thus a greater reduction of the frequency portion at or near $(n \pm \frac{1}{3})f_H$.

An object of the invention is to provide an improved three-line sequential transmission system for a color television signal.

Another object of the invention is to provide such an improved three-line sequential transmission system in which the picture sharpness in the vertical direction is increased.

A further object of the invention is to provide such an improved three-line sequential transmission system, for a color television signal, which represents a distinct and patentable advance over the known systems of this type.

For an understanding of the principles of the invention reference is made to the following description of typical embodiments thereof as illustrated in the accompanyong drawings.

DESCRIPTION OF THE PREFERRED EMBODIMENTS

Figure 1:
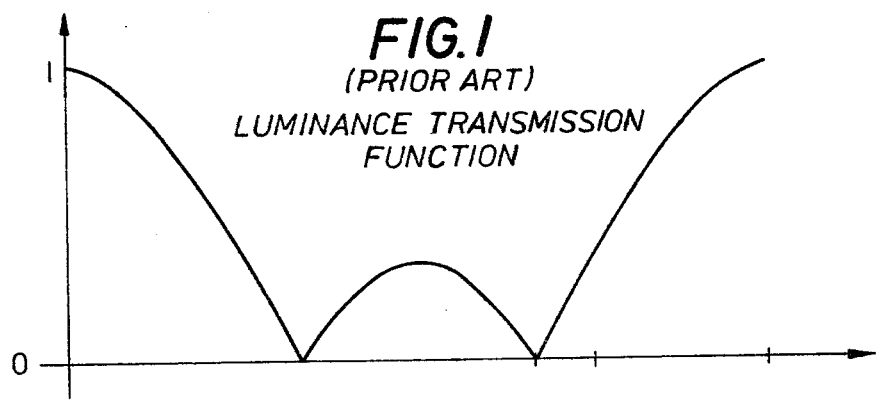
FIG. 1 is a graphical illustration of the luminance transmission function of a known three-line sequential transmission system.

Referring to the drawings, FIG. 1 graphically illustrates that the luminance transmission function of a known transmission system at the frequencies $(n+\frac{1}{2})f_H$ has only one third the amplitude available at the frequencies $n \cdot f_H$.

Figure 2:
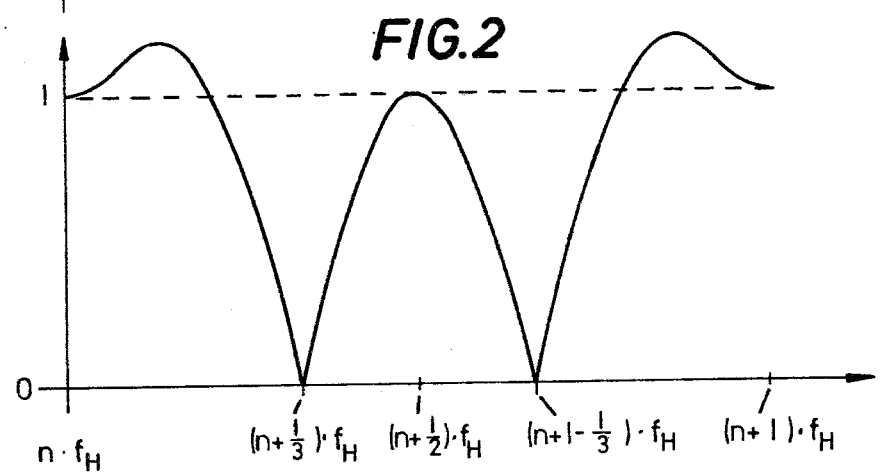
FIG. 2 is a graphical illustration of a luminance transmission function attained by the present invention.

FIG. 2 graphically illustrates a total transmission function attained by the proportioning in accordance with the present invention. In FIG. 2, the amplitude of the maximum, at the frequencies $(n+\frac{1}{2})f_H$, has been increased to the value at the frequencies $n \cdot f_H$. Due to this increase of the spectral components at $(n+\frac{1}{2})f_H$, the picture sharpness is increased in the vertical direction. This variation of the luminance transmission function, illustrated in FIG. 2, as compared to that illustrated in FIG. 1, can be attained by a special composition of the luminance signal from the signals of more than three successive lines, particularly of four successive lines. The variation of the luminance transmission function in accordance with the invention, and thus the variation indicated in FIG. 2 as compared to FIG. 1, for example, can be obtained during recording, during reproduction, or during recording and during reproduction.

Figure 3:
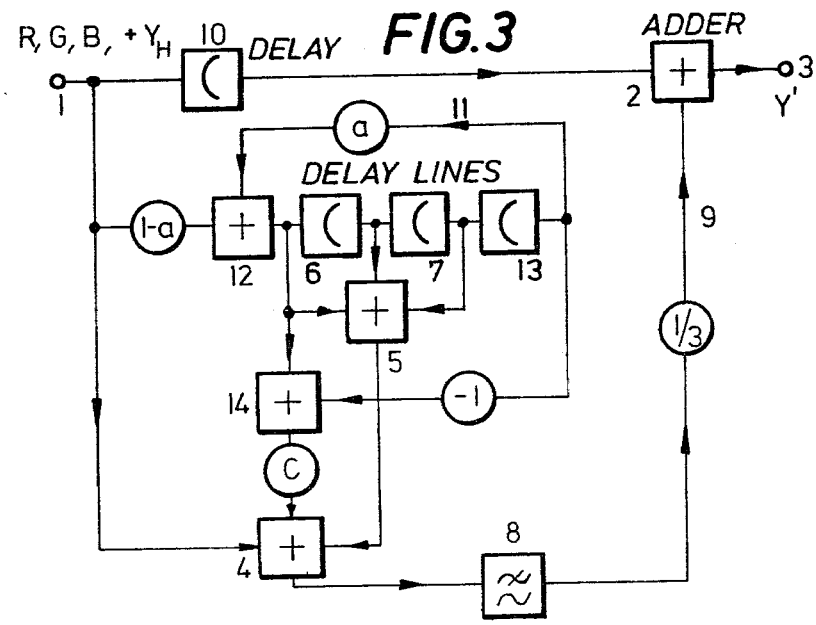
FIG. 3 is a block diagram of one embodiment of the invention for reproduction.

FIG. 3 illustrates a reproduction circuit for a three-line sequential signal as is described, in principle, in German Pat. No. 2,207,021, only for the luminance signal. At terminal 1, there appears the signal arriving from a recording device, and which contains, in the lower frequency range of 0–0.5 MH$_z$ line-sequentially the signals R, G and B, and, in the upper frequency range, the luminance signal $Y_H$. In adding stage 2, a differential signal is added to the input signal, which equalizes the signal differences between three successive lines so that a wide-band luminance signal Y' of 0–3 MH$_z$ is formed at terminal 3.

The differential signal is obtained in adding stage 4. Thus, in stage 4, there is added, to the undelayed signal, a signal which is obtained in adding stage 5 from the signals of three successive lines at the taps of the series connection of two line delay lines 6 and 7. A low-pass filter 8 serves to limit the signal, fed to the adding stage over line 9, to the lower frequency range of 0–0.5 MH$_z$ since the luminance signal $Y_H$ in adding stage 2 should not be influenced in the upper frequence range of 0.5 to 3.0 MH$_z$. A delay element 10 serves to equalize the delay time.

For increasing the picture sharpness in the vertical direction, that is, for varying the luminance transmission function illustrated in FIG. 1 to obtain the luminance transmission function shown in FIG. 2, there are used a feedback path 11, an adding stage 12, a third line delay line 13, and adding stage 14. In adding stage 14, there is obtained a differential signal from the undelayed signal and the signal delayed by three lines, from the output of delay line 13, and this is fed with the amplitude factor c to adding stage 4. If the relation $c=(2a+1)/(1-a)$ exists between the represented factors a and c, the above-described variation of the luminance transmission function is attained in such a manner that the amount of the transmission function at $(n+\frac{1}{2})f_H=1$. In the absence of a feedback path 11, and thus with a=0 and c=1, this reproduction circuit has also the zeros in the transmission function as represented in FIG. 2.

Figure 4:
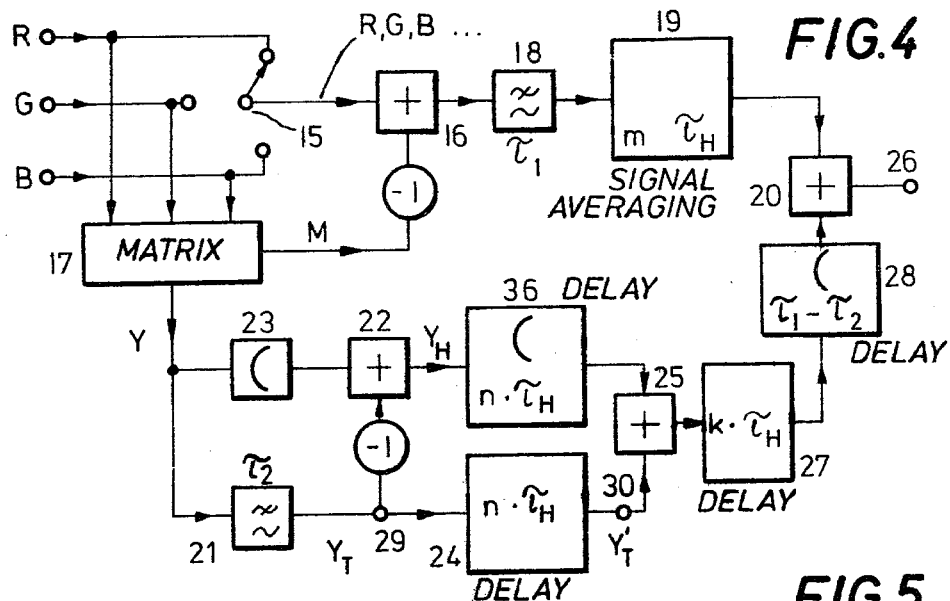
FIG. 4 is a block diagram of an embodiment of the invention for recording.

Referring to FIG. 4, a three-line sequential signal R, G, B is obtained, for recording, from the three color signals R, G, and B with the line frequency switch 15, from which a luminance signal M, obtained in the matrix 17, is subtracted in an adding stage 16. The signal is limited with a low-pass filter 18 to 0.5 MH$_z$ and fed, over a correction circuit 19, to adding stage 20. Circuit 19 reduces the band width of the sequential color difference signals, in the vertical direction, by averaging, over several lines, with the object of reducing, in the reproduction, the cross-coloring the color difference signals to the luminance signal, the so-called cross-luminance.

Matrix 17 additionally supplies a wide-band luminous signal Y. With the low-pass filter 21, there is obtained from this wide-band luminance signal Y, a luminance signal $Y_T$, comprising the lower frequency range of 0–0.5 MH$_z$, which is subtracted, in adding stage 22, from the signal Y, so that a luminance signal $Y_H$, in the upper frequency range of 0.5 to 3.0 MH$_z$, is obtained. A delay line 23 serves to equalize the delay time of low-pass filter 21.

Signal $Y_T$ is treated, in circuit 24, to increase the picture sharpness in the vertical direction, and arrives as a signal $Y'_T$ in adding stage 25, where it is combined with signal $Y_H$ to a luminance signal. The latter signal is then added, in adding stage 20, to the sequential color difference signal, so that a signal is available at terminal 26 for a recording which is processed in the circuitry of FIG. 3 at the terminal for reproduction. Delay line 23 serves to equalize the delay time of low-pass filter 21. Delay line 36 serves to equalize the delay time of circuit 24 to obtain the signal $Y'_T$, and effects a delay of several lines. Delay line 27 equalizes, on the one hand, the delay time difference between circuit 19 and the combination of circuit 24 in delay line 36, and serves, on the other hand, to equalize, that is, to precompensate, the delay time differences for the color and luminance signal appearance in the reproduction circuit. Delay line 28 serves to equalize the delay time difference of the low-pass filters 18 and 21. For the cooperation of this recording circuit with the reproduction circuit shown in FIG. 3, with a=0, in FIG. 4, m=3 and k=1.

Figure 5:
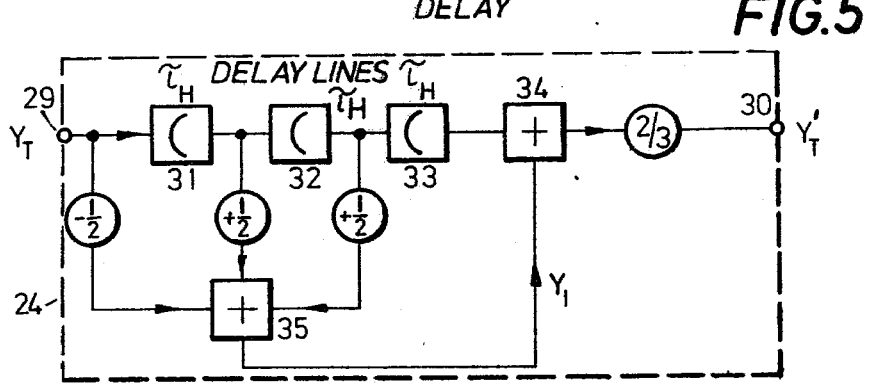
FIG. 5 is a block diagram of the internal structure of a part of FIG. 4.
Figure 7A:
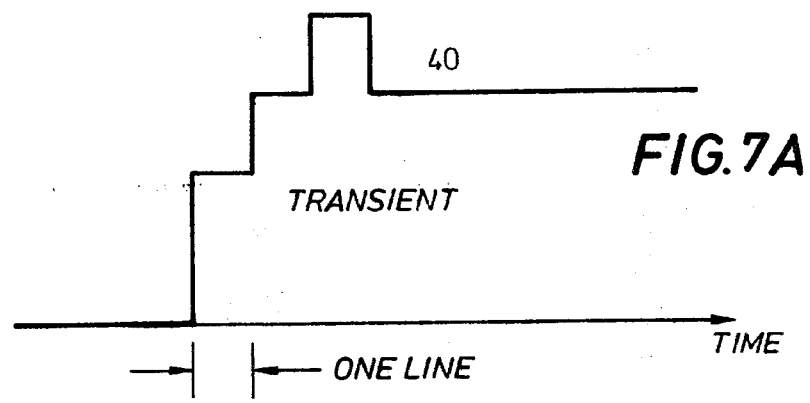
FIGS. 7A–7C graphically illustrate the course of a transient in the luminance signal with and without the solution embodying the present invention.
Figure 7B:
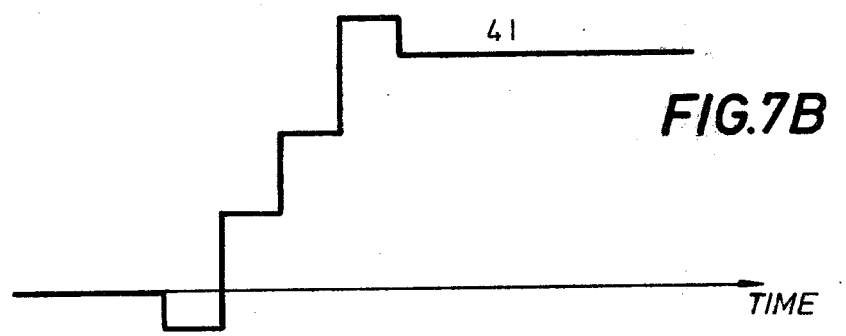

FIG. 5 illustrates a possible internal design of circuit 24. The illustrated circuit contains three line delay lines 31, 32 and 33 and two adding stages 34 and 35. The signals are added with the represented amplitude factors. Signal $Y_T$ is thus transformed, according to the proportioning embodying the invention, into signal $Y'_T$. The illustrated circuit likewise has a transmission function according to FIG. 2, with the represented zeros. It thus already introduces these zeros on the recording side into the transmission function of the luminance signal. Circuit 24 of FIGS. 4 and 5, which is on the recording side, has a triple function. Due to the above-described increase of the picture sharpness on the reproduction side, overshooting of the luminance signal appears in successive lines after horizontal lines, and thus there appear great luminance transients in the vertical direction in the picture. FIG. 7A shows, in curve 40, the step function. It can be seen that this function shows great overshooting and a great assymetry. Due to circuit 24, the transient process is symmetrized and the overshooting thus reduced. To this end, circuit 24 is so proportioned that, in the entire transmission function, that is, for example, in the frequency range of 0 to 0.5 MH$_z$, the phase depends substantially linearly on the frequency. Due to the symmetrization, the steepness of the transient process can be reduced in an undesired manner, as shown in FIG. 7B by curve 41. Curve 41 is formed when jumps of 180° appear in the linear course of the phase of the resulting total transmission function.

Figure 7C:
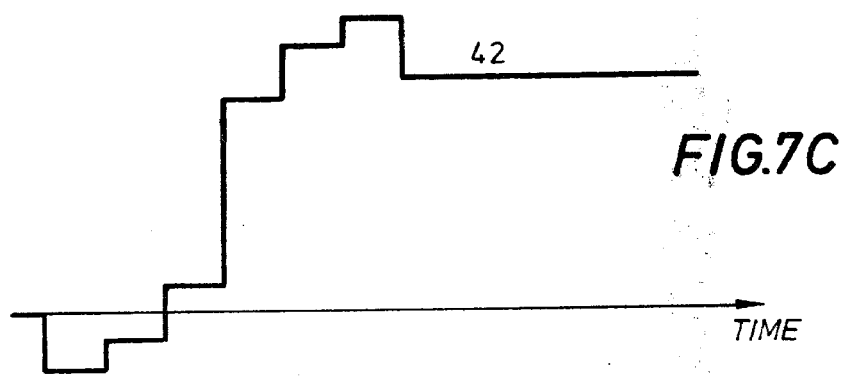

A second function of the circuit is therefore to make sure that these jumps are avoided. To this end, circuit 24 is so proportioned that the zeros, in the total transmission function, are even-numbered multiple zeros. In the frequency characteristic of the reproduction circuit has, for example, only single zeros at expression $(n+\frac{1}{2})f_H$, the correction circuit 24 has, during the recording, preferably likewise single zeros at these frequencies. In this way, optimum picture sharpness is combined with symmetry of the transient process. The optimum curve thus obtained is designated, in FIG. 7C, at 42, and it can be seen that curve 42 has a symmetrical transient process and also is very steep.

Apart from the improvement of the transient process of the luminance signal, circuit 24 has a third function, namely to improve the color reproduction. The circuit suppresses spectral lines of the luminance signal at the frequencies $(n\pm\frac{1}{3})f_H$, because portions of the reproduction circuit are evaluated here as color difference signals. Circuit 24 thus reduces, at the same time, the cross-coloring of the luminance signal into the color channel, by the zeros produced at the frequencies $(n\pm\frac{1}{3})f_H$. Each of the circuit according to FIG. 3 and the circuits according to FIGS. 4 and 5 thus has a luminance transmission function whose amount is shown in FIG. 2. If these two circuits are in the transmission path at the same time, a transmission function with a double zero is formed for the luminance transmission function of the entire system including recording and reproduction.

Figure 6:
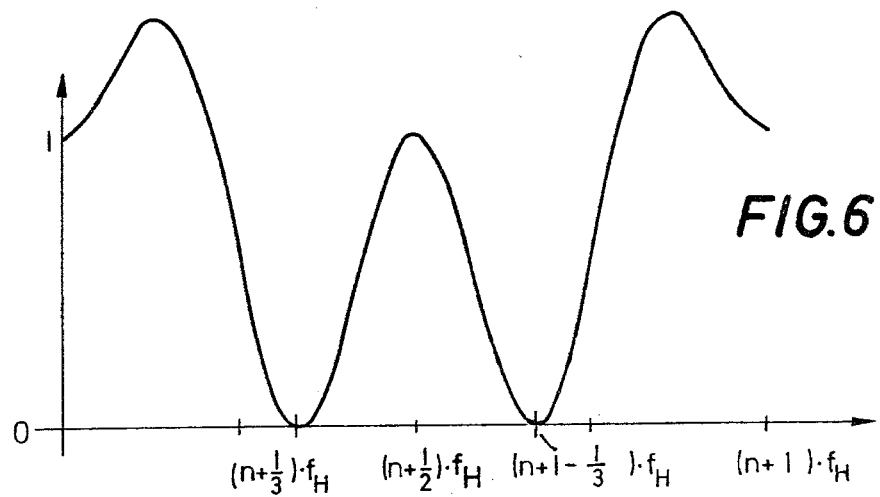
FIG. 6 graphically illustrates a luminance transmission function with a double zero, according to a further development of the invention.

FIG. 6 graphically shows such a luminous transmission function with a double zero at frequencies $(n\pm\frac{1}{3})f_H$. It is thus important that zeros already exist during recording, for example before the recording on a picture plate, in the transmission function of the luminance signal at the frequencies $(n\pm\frac{1}{3})f_H$.

In a jump of the luminance signal in the vertical direction, hence, for example, with the horizontal edge in the picture, a very long rise time and a very low overshoot, possibly symmetrical to the jump point, are required for the step function from line to line. These two requirements can not always be met optimally. However, an optimum compromise between these two requirements is achieved with the dimensioning of the luminance transmission function in accordance with the invention.

While specific embodiments of the invention have been shown and described in detail to illustrate the application of the principles of the invention, it will be understood that the invention may be embodied otherwise without departing from such principles.

What is claimed is:

1. In a three-line sequential transmission system for a color television signal, particularly for recording, where the sequential signal is transformed again, during reproduction with a series-connection of line delay lines, into three simultaneous color signals, and a luminance signal is obtained by composing the signals from several successive lines, the improvement comprising means deriving a luminance signal, composed from signals from several successive lines, with an amplitude ratio between said signals, to increase the picture sharpness in the vertical direction, such that the amount of the luminance transmission function of the entire system, including recording and reproduction, at the frequencies $(n+\frac{1}{2})f_H$ is substantially equal to those at the frequencies $n\cdot f_H$ where $n=0, 1, 2 \ldots$ and $f_H$ is the line frequency.

2. In a three-line sequential transmission system, the improvement claimed in claim 1, in which said means effects the composition of the luminance signal such that zeros appear in the low frequency range of the transmission function at the frequencies $(n\pm\frac{1}{3})f_H$.

3. In a three-line sequential transmission system, the improvement claimed in claim 2, in which the zeros of the entire system, including recording and reproduction, are multiple even-numbered zeros.

4. In a three-line sequential transmission system, the improvement claimed in claim 3, in which the transmission function of the recording and the transmission function of the reproduction have respective zeros.

5. In a three-line sequential transmission system, the improvement claimed in claim 1, in which the phase depends substantially linearly on the frequency, in the transmission function of the entire system, including recording and reproduction, at low frequencies.

6. In a three-line sequential transmission system, the improvement claimed in claim 5, in which the transmission function is free of 180° phase jumps.

7. In a three-line sequential transmission system, the improvement claimed in claim 1, including a reproduction circuit; means in said reproduction circuit operable to combine the undelayed input signal thereto and a signal delayed by three lines to produce a differential signal; and means in said reproduction circuit feeding said differential signal to the output luminance signal.

8. In a three-line sequential transmission system, the improvement claimed in claim 7, including a series-connection of three delay lines between an input and an output; and a feedback path, with an amplitude factor a, connected between the input and output of said series-connection of three delay lines.

9. In a three-line sequential transmission system, the improvement claimed in claim 8, in which said differential signal is added to said luminance signal with an amplitude factor c, where $$c=(2a+1)/(1-a).$$

10. In a three-line sequential transmission system, the improvement claimed in claim 1, including a recording circuit having an input receiving an input luminance signal and an output providing an output luminance signal delayed by three lines; and means in said recording circuit operable during recording, to combine the undelayed input luminance signal with the luminance input signal delayed by one line and the luminance input signal delayed by two lines to provide a further luminance signal added to the input luminance signal delayed by three lines and supplied to said output.

11. In a three-line sequential transmission system, the improvement claimed in claim 10, in which said undelayed input luminance signal is evaluated with the amplitude factor $-\frac{1}{2}$ and the two delayed signals combined therewith are evaluated with the amplitude factor $+\frac{1}{2}$.

12. In a three-line sequential transmission system, the improvement claimed in claim 1, including a series-connection of three line delay lines operable to provide a luminance signal composed from four sequential lines.

13. In a three-line sequential transmission system, the improvement claimed in claim 1, including a series connection of $n\cdot f_H$ line delay lines, where n is an integral number; said series connection having taps and said luminance signal being composed of signals derived from said taps.

14. In a three-line sequential transmission system, the improvement claimed in claim 13, wherein the composition of the undelayed signal and of the delayed signals is effective to satisfy the condition that the amount of the luminance transmission function of the entire system, including recording and reproduction, at the frequencies $(n+\frac{1}{2})f_H$ is substantially equal to those at the frequencies $n\cdot f_H$ where $n=0, 1, 2 , , ,$ and $f_H$ is the line frequency, that zeros appear in the low frequency range of the transmission function at the frequencies $(n\pm\frac{1}{3})f_H$, that the phase depends approximately linearly on the frequency in the transmission function of the entire system, at low frequencies, and that the transmission function is free of 180° phase jump.

15. In a three-line sequential transmission system for a color television signal, particularly for recording, where the sequential signal is transformed again, during reproduction with a series-connection of line delay lines, into three simultaneous color signals, and a luminance signal is obtained by composing the signals from several successive lines, the improvement comprising means deriving a luminance signal, composed from signals from several successive lines, with an amplitude ratio between said signals, to increase the picture sharpness in the vertical direction, such that the amount of the luminance transmission function of the entire system, including recording and reproduction, at the frequencies $(n+\frac{1}{2})f_H$ is substantially equal to those at the frequencies $n \cdot f_H$ where $n = 0, 1, 2 \ldots$ and $f_H$ is the line frequency, said means effecting the composition of the luminance signal such that zeros appear in the low frequency range of the transmission function at the frequencies $(n \pm \frac{1}{3})f_H$, zeros of the entire system, including recording and reproduction, being multiple even-numbered zeros.

* * * * *